United States Patent [19]

Kobori et al.

[11] 3,833,912

[45] Sept. 3, 1974

[54] EXPOSURE CONTROL SYSTEM FOR A SINGLE LENS REFLEX CAMERA

[75] Inventors: Toshio Kobori; Masaru Ohba, both of Osaka, Japan

[73] Assignee: Minolta Camera Kabushiki Kaisha, Osaka-fu, Japan

[22] Filed: Oct. 9, 1973

[21] Appl. No.: 404,464

[30] Foreign Application Priority Data
Oct. 17, 1972  Japan........................ 47-119305[U]

[52] U.S. Cl..................................... 354/24, 354/51
[51] Int. Cl. ............................................ G03b 7/08
[58] Field of Search......................... 354/24, 50, 51

[56] References Cited
UNITED STATES PATENTS
3,712,194  1/1973  Yoshimura........................... 354/51
3,733,984  5/1973  Yata ................................... 354/51

*Primary Examiner*—Samuel S. Matthews
*Assistant Examiner*—Michael L. Gellner
*Attorney, Agent, or Firm*—Wolder & Gross

[57] ABSTRACT

An exposure control system in a single lens reflex camera has a variable resistor adjusted depending upon the film sensitivity value and a variable resistor adjusted with the set value of the diaphragm aperture, the resistors being connected in series with a light measuring circuit including a photoelectric element which receives the light traversing the photographing lens and producing a light measuring output voltage corresponding to a logarithmic value of the light incident on the photoelectric element, so as to produce a control voltage for exposure control depending upon the film sensitivity value, the diaphragm aperture value which is adjusted at the time of exposure and the brightness of a photographic object. A switch is connected between one terminal of the diaphragm aperture variable resistor and the sliding contact terminal moveable in association with a movement of the diaphragm adjusting ring of the camera, the switch being closed for producing a control voltage from the stop down exposure measuring outputs and opened for producing a control voltage from the full aperture exposure measuring output, thus controlling the shutter exposure time under stopped down and fully open diaphragm aperture viewing.

10 Claims, 2 Drawing Figures

PATENTED SEP 3 1974  3,833,912

EXPOSURE CONTROL SYSTEM FOR A SINGLE LENS REFLEX CAMERA

BACKGROUND OF THE INVENTION

The present invention relates generally to an exposure time control system for a single lens reflex camera, and it relates more particularly to an exposure time control system for a single lens reflex camera, wherein the scene light transmitted through the objective lens of a single lens reflex camera is measured, and on exposure condition is combined with the light measuring output voltage, thereby producing a control voltage for controlling the exposure time.

A single lens reflex camera, in general, has the advantage in that a scene to be photographed is viewed directly through a view finder by way of the objective lens. Accordingly, there are two types of photographing method: one type is that in which a diaphragm, when in the viewing position, is set to the aperture value in the exposure position, and another in which the diaphragm is opened to its full position when in its viewing position, and then automatically adjusted to a preset value of aperture at the time of exposure. In either case, the brightness of the scene light transmitted through the objective lens is measured by the light measuring circuit when the camera is in its viewing condition.

Accordingly, in the former photographing method, information of the diaphragm aperture in the exposure position is combined with the light measuring output, and hence no further information is required for obtaining a control voltage for the exposure time control from the light measuring output voltage. On the other hand, in the latter method, the information of the diaphragm aperture in the exposure position is not combined with light measuring output voltage, so that in order to provide a control voltage, the information of the diaphragm aperture in the exposure position must be combined with the light measuring output voltage.

It is therefore an object of the present invention to provide an exposure control system, wherein in a light measuring system for a single lens reflex camera which measures the brightness of scene light transmitted through the objective lens, a control voltage for controlling the exposure time with respect to the diaphragm aperture in the exposure position can be produced either by the light measurement through a stop down diaphragm aperture, or by the light measurement through a fully open aperture.

Another object of the present invention is to provide an improved exposure control system, in which a variable resistor adjusted depending upon a set value of diaphragm aperture is connected in series with a light measuring circuit which measures the brightness of the scene light transmitted through the objective lens and which produces a light measuring output voltage corresponding to the logarithmic value of said brightness, said variable resistor having an adjustable portion adapted to be short-circuited, so as to produce a control voltage for controlling the exposure time with respect to a proper diaphragm aperture in the exposure position, either by the light measurement with the stop down exposure measuring method, or by the light measurement according to the full aperture exposure measuring method, and thus the switching between both light measuring methods is facilitated.

A further object of the present invention is to provide a shutter exposure time control system, wherein in a light measuring system for a single lens reflex camera by which the brightness of scene light is measured, a control voltage for controlling an exposure time for a proper diaphragm aperture in the exposure position can be produced either by the light measurement according to the stop down exposure measuring method, or by the light measurement according to the fully open aperture-exposure measuring method, and said control voltage is stored and retained until the time of exposure, thereby ensuring the proper control of exposure time.

SUMMARY OF THE INVENTION

In attaining the above objects, the present invention contemplates the provision of an exposure control system for a single lens reflex camera, wherein a variable resistor adjusted depending upon the film sensitivity value and a variable resistor adjusted depending upon a set value of diaphragm aperture, which are in series relation with each other, are connected in series with a light measuring circuit including a photoelectric element receiving the scene light transmitted through an objective lens and producing a light measuring output voltage corresponding to a logarithmic value of the received light intensity of said photoelectric element, so as to apply a constant current therethrough. A switch member is connected between a fixed terminal and a sliding contact terminal of said variable resistor adjusted depending upon a set value of diaphragm aperture, the switch member being opened or closed, in association with the movement of a diaphragm adjusting member, the switch member being actuated so as to short-circuit the corresponding resistor portion to produce voltage corresponding the diaphragm aperture value effected at the time of exposure, and thereby producing a control voltage for controlling the shutter exposure time depending upon the value of the preset diaphragm aperture to be adjusted at the time of exposure, and said switch member being opened for producing the control voltage from the light measuring output voltage produced by the full aperture exposure measuring method.

DESCRIPTION OF THE PREFERRED EMBODIMENT

Figure 2:
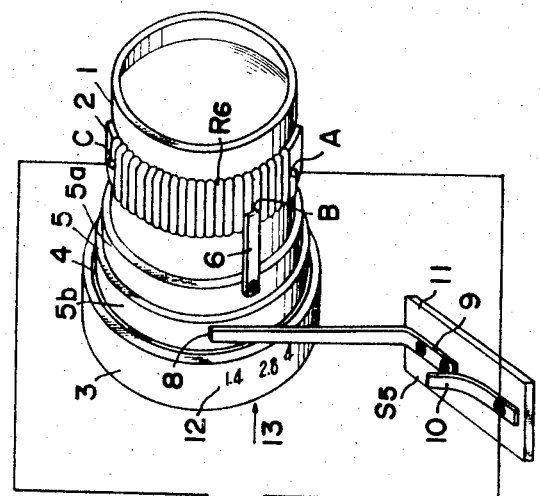

Referring now to the drawing which illustrates a preferred embodiment of the present invention, a pair of resistors R1 and R2 are connected in series through an electric power source switch S1 which is left open when the camera is not in use across an electric power source E. The junction point of the resistors R1 and R2 is connected as an input to the base of a transistor Tr1. The emitter of transistor Tr1 is connected through a resistor R3 to the positive line connected through switch S1 to the positive of the electric power source E. Connected to the collector of a transistor Tr2 are two resistors R4 and R4' which are connected in series with each other plus a photoelectric element RO and a resistor R5 which are connected in series with each other and in parallel relationship with the resistors R4 and R4'. The junction point between the resistors R4 and R4' is connected to the base of transistor Tr2.

The photoelectric element RO which is a photoconductor is disposed within the camera so as to receive light rays from a photographic object which has been transmitted through or traversed the photographing objective lens. With the electric circuit described, a regulated constant current is positively fed to the collector of transistor Tr1 even if voltage fluctuation occurs in the dry cells of the electric power source E, such that there is produced a light responsive or measuring output voltage proportional to a logarithmic value of the received light intensity at the junction point between the photoelectric element RO and the resistor R5.

Connected to the emitter of transistor Tr2 are an electric circuit consisting of a resistor R13 for compensating for changes in ambient temperature and a thermister R14 which are connected in parallel relationship with each other, a correction resistor R8, a variable resistor R7, the resistance of which is adjusted by a brush 7 depending upon a set value of the used film speed or sensitivity, and a variable resistor R6, the resistance of which is adjusted depending upon a set value of the objective diaphragm aperture, the compensating resistor R8, variable resistor R7 and variable resistor R6 being connected in series with each other.

The variable resistor R6 whose resistance is adjusted according to the corresponding set value of the diaphragm aperture includes a resistance element formed on an insulating ring 2 attached to a fixed ring 1 of the objective lens barrel, as shown in FIG. 2. A moveable brush 6 is disposed in sliding contacting engagement with the resistance element of variable resistor R6, the moveable brush 6 projecting from a diametrically reduced portion 5a of a conductive ring 5 which is rotatable relative to the fixed ring 1 and has an outer diameter portion integrally formed with the diametrically reduced portion 5a and a diametrically enlarged portion 5b. A diaphragm adjusting ring 3 is rigidly fitted by means of an insulating ring 4 around the conductive ring 5, the diaphragm adjusting ring 3 having diaphragm graduation indicia 12 so as to set the value of the diaphragm to be adjusted at the time of exposure by bringing the graduation indica in alignment with an indication 13 provided on the fixed lens barrel. A resilient contact arm 8 is provided, one end of the contact arm 8 being normally maintained in slidingly contacting relationship with the diametrically enlarged portion 5b of conductive ring 5, while the other end thereof is fixed on an insulating plate 11 on the camera or lens barrel, thereby defining a fixed contact 9 of a make-and-break switch S5. The switch S5 includes a moveable contact defining resilient arm 10 disposed on the insulating plate 11. The variable resistor R6 has a terminal C connected to the variable resistor R7, while a terminal A connected to a negative pole of the electric power source E has a resistance corresponding to the value of that represented by the opened diaphragm of photographing lens. A point B, at which the moveable terminal 6 contacts the variable resistor R6, is so located as to give a resistance to be adjusted between B and C, which resistance corresponds to a value of diaphragm to be set at the time of exposure as described, so the resistor portion between the set value of the diaphragm to be adjusted at the time of exposure and the value of opened diaphragm, i.e., the resistor portion between A and B, can be partly short-circuited by closing the switch S5. Accordingly, if the switch S5 is closed, current does not flow through the resitor between A and B, and thus voltage corresponding to the resistance between C and B, i.e., the resistance corresponding to the diaphragm aperture value to be adjusted at the time of exposure is added to the output voltage in said light measuring circuit, thereby producing a control voltage. Thus, when the switch S5 is opened, a control voltage is obtained from the light measuring output voltage which has been obtained by the measurement of the scene light passing through a diaphragm aperture of the aperture value equivalent to that of the diaphragm aperture in the exposure position, while when the switch S5 is closed, a control voltage will be produced from the light measuring output which has been obtained by the measurement of the scene light passing through the diaphragm to be opened.

Figure 1:
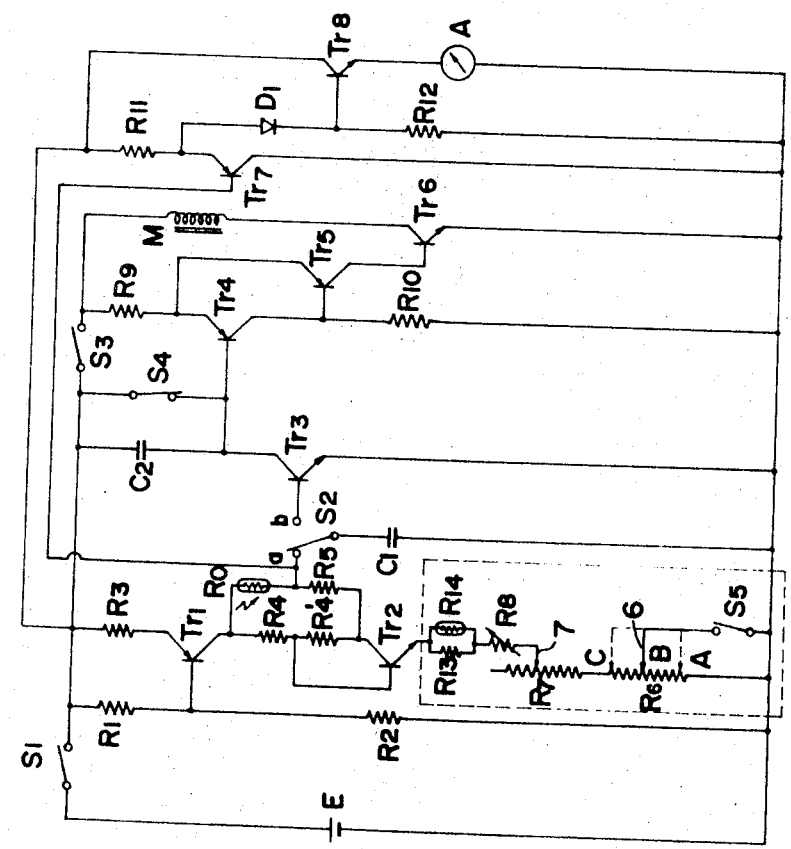
FIG. 1 is a circuit diagram of an exposure time control circuit according to a preferred embodiment of the present invention; and, FIG. 2 is a perspective view of the diaphragm adjusting member of the embodiment of FIG. 1.

The control voltage thus produced is stored in a memory capacitor C1 through a terminal $a$ of switch S2 prior to the exposure, as shown in FIG. 1.

The switch S2 is normally maintained in contact with the terminal $a$, and it is connected to the terminal $b$ in advance of the releasing of the shutter by being disconnected from the terminal $a$, before the camera is transferred from the viewing position to the picture taking position due to the shutter releasing operation and the diaphragm value desired is set for the diaphragm aperture required at the time of exposure prior to the reflecting mirror being rotated from the viewing position to the picture taking position.

A transistor Tr3 having a base connected to the terminal $b$ produces a collector current obtained by antilogarithmically coverting the base voltage. Connected to a collector of the transistor Tr3 is a time constant capacitor C2, with which a trigger switch S4 is connected in parallel, the trigger switch S4 being opened in association with the commencement of travel of the front curtain of the shutter. Thus, when the capacitor C2 reaches a predetermined level of voltage, a switching circuit consisting of transistors Tr4, Tr5 and Tr6 and resistors R9 and R10 is caused to be actuated, thereby interrupting the exciting current to an electromagnet M connected to the collector of transistor Tr6, whereby said electromagnet M releases the rear curtain of shutter, thereby completing the exposure.

A switch S3 connected between the electromagnet M and the electric power source positive line is a switch for electromagnet which is normally maintained open and is closed by the shutter release operation.

There is provided a meter circuit consisting of a transistor Tr7 having an emitter connected to the positive side of the electric power source and a base connected to terminal $a$ of switch S2, a resistor R11, a diode D1, a resistor R12, a transistor Tr8 and an ammeter A, said meter circuit serving for indicating a time of exposure depending upon voltage at the terminal $a$ by the ammeter A.

With the construction of the present invention as described above, for producing the control voltage by the full aperture exposure measuring method in which control voltage is obtained from the light measuring output voltage produced by the scene light passing through the objective diaphragm in the fully opened position at the time of the light measurement, the switch S5 is closed, while in the stop down exposure measuring method which measures the scene light passing through the diaphragm aperture which has been adjusted at the time of light measurment to a diaphragm aperture in the exposure position, the switch S5 is caused to be opened for producing the control voltage. Accordingly, both light measuring methods may be used in combination for effecting exposure control.

While there has been described and illustrated a preferred embodiment of the present invention, it is apparent that numerous alterations, omissions and additions may be made without departing from the spirit thereof.

We claim:

1. In a single lens reflex camera having an objective lens with a variable settable aperture diaphragm and provided with a light measuring circuit including a photoelectric element which receives the scene light traversing the objective lens and producing a light measuring output voltage corresponding to a logarithmic function of the light incident on said photoelectric element, an exposure control system comprising;
   a first variable resistor adjustable in accordance with the film sensitivity value and a second variable resistor adjustable in response to the set value of the diaphragm aperture, said first variable resistor and second variable resistor being connected to said light measuring circuit;
   a diaphragm adjusting member for setting the value of the diaphragm aperture which is effected at the time of exposure;
   a sliding contact moveable in electrical engagement with the resistance element of said second variable resistor, in cooperation with a movement of said diaphragm adjusting member;
   a fixed terminal effecting a resistance corresponding to the value of the fully opened diaphragm aperture on said second variable resistor; and,
   a switch member transferable between opened and closed positions and connected between said sliding terminal and said fixed terminal.

2. An exposure control system for a single lens reflex camera as set forth in claim 1, further comprising;
   means for biasing the light measuring output from said light measuring circuit to thereby produce a control voltage, said means serving to feed constant current to a circuit which is of series connection and having said light measuring circuit, said first vairable resistor and said second variable resistor.

3. An exposure control system for a single lens reflex camera as claimed in claim 2, wherein the arrangement of said second variable resistor is such that a first control voltage is equal to a second control voltage
   said first control voltage being obtained by biasing the light measuring output voltage from said light measuring circuit by a voltage produced at said first and second variable resistors, said light measuring output voltage being produced by the photoelectric element which has received the scene light transmitted through an aperture and an objective lens at the time of the closure of said switch member in the stop down exposure measuring method, and,
   said second control voltage being obtained by biasing the light measuring output voltage from said light measuring circuit by said first variable resistor and said second variable resistor which has been adjusted to the set value of diaphragm aperture, to the value of which the diaphragm adjusting member is to be set at the time of exposure, said light measuring output voltage being obtained by the photoelectric element which has received, through a fully opened aperture and objective lens, the scene light of the brightness the same as in said stop down exposure measuring method when said switch member is in the open position.

4. An exposure control system for a single lens reflex camera as claimed in claim 2, further comprising;
   a storage means; and
   a second switch means adapted to connect said control voltage to said storage means and release the connection between said voltage and said storage means before a moveable mirror is shifted from a viewing position to a picture taking position in cooperation with a release operation of the camera and before said diaphragm adjusting member adjusts an open diaphragm to a value of diaphragm aperture to be set.

5. In a single lens reflex camera including an objective lens having a variable aperture diaphragm which is adjustably settable and is adjustably presettable to an aperture value which is effected in advance of the opening of the camera shutter and a shutter exposure timing network, a circuit comprising a photoelectric element exposed to light traversing said objective, a first variable resistance adjustable to correspond to the film sensitivity rating, a second variable resistance network including a resistance element and a moveable contact slideably engaging said resistance element and a switch connected between said moveable contact and a fixed terminal on said resistance element and switchable between open and closed positions, said second resistance network having a value corresponding to the diaphragm fully open aperture with said switch open and a value corresponding to said diaphragm value preset value with said switch closed and means for producing a voltage which is a function of the value of said first resistor, second resistance network and the light incident on said photoelectric element for controlling said timing network.

6. The camera of claim 5 including a photoconductor as said photoelectric element and means for effecting the flow of a regulated predetermined constant current in series through said first resistor, second resistance network and said photoconductor.

7. The camera of claim 5 including a photoconductor as said photoelectric element and a memory capacitor and means for charging said memory capacitor to said control voltage which is a logarithmic function of said photoconductor incident light.

8. The camera of claim 7 including switching means for alternatively coupling said memory capacitor to the output of said control voltage producing means and to the input of said shutter timing network.

9. The camera of claim 7 including a voltage source and a pair of first and second transistors each including a base and first and second output electrodes, a network including said photoconductor connected between the first output electrodes of said first and second transistors, means connecting said first transistor second output electrode to one terminal of said voltage source, means including said first resistor and second resistor network connected in series connecting said second transistor second output electrode to the second terminal of said voltage source, means including a voltage divider connected across said voltage source for applying a bias signal to said first transistor base, and means for applying a signal derived from said network between said transistors to said second transistor base.

10. The camera of claim 9 wherein said control voltage is derived from said network between said transistors.

* * * * *